(12) United States Patent
Niizuma

(10) Patent No.: US 9,849,797 B2
(45) Date of Patent: Dec. 26, 2017

(54) WIRELESS POWER-TRANSMITTING DEVICE AND SYSTEM

(71) Applicant: IHI CORPORATION, Tokyo (JP)

(72) Inventor: Motonao Niizuma, Tokyo (JP)

(73) Assignee: IHI Corporation, Tokyo (JP)

( * ) Notice: Subject to any disclaimer, the term of this patent is extended or adjusted under 35 U.S.C. 154(b) by 210 days.

(21) Appl. No.: 14/886,656

(22) Filed: Oct. 19, 2015

(65) Prior Publication Data

US 2016/0039293 A1    Feb. 11, 2016

Related U.S. Application Data

(63) Continuation of application No. PCT/JP2014/066430, filed on Jun. 20, 2014.

(30) Foreign Application Priority Data

Jul. 23, 2013   (JP) ................... 2013-152690

(51) Int. Cl.
*B60L 1/00* (2006.01)
*B60L 3/00* (2006.01)
*B60L 11/18* (2006.01)

(52) U.S. Cl.
CPC ......... *B60L 11/182* (2013.01); *B60L 11/1803* (2013.01); *B60L 11/1824* (2013.01); *B60L 11/1833* (2013.01); *B60L 11/1835* (2013.01); *B60L 11/1838* (2013.01); *B60L 11/1846* (2013.01); *B60L 2210/30* (2013.01); *B60L 2210/40* (2013.01); *B60L 2240/667* (2013.01); *Y02T 10/7005* (2013.01); *Y02T 10/7072* (2013.01); *Y02T 10/7241* (2013.01); *Y02T 10/7291* (2013.01); *Y02T 90/121* (2013.01);
(Continued)

(58) Field of Classification Search
CPC ............... B60L 11/182; B60L 11/1838; B60L 11/1824; B60L 11/1833; B60L 11/1835; B60L 11/1846; B60L 11/1803
USPC ........................................... 320/109
See application file for complete search history.

(56) References Cited

U.S. PATENT DOCUMENTS 8,917,056 B2 * 12/2014 Jung .................. H02J 5/005
                                                180/65.21
8,946,938 B2 *  2/2015 Kesler ................. B60L 11/182
                                                307/10.1
(Continued)

FOREIGN PATENT DOCUMENTS

CN        101772790 A    7/2010
CN        102fi40395 A   8/2012
(Continued)

OTHER PUBLICATIONS

International Search Report, PCT/JP2014/066430, dated Sep. 16, 2014, 2 pgs.

*Primary Examiner* — Kenneth B Wells
(74) *Attorney, Agent, or Firm* — Volpe and Koenig, P.C.

(57) ABSTRACT

A wireless power-transmitting device includes a power-transmitting coil installed in a predefined parking area, a receiving device configured to receive a signal for a power supply instruction transmitted through a windshield or through a rear window of a vehicle, and a control device configured to control supply of electric power from the power-transmitting coil to a power-receiving coil of the vehicle based on the signal received by the receiving device.

11 Claims, 7 Drawing Sheets

(52) U.S. Cl.
CPC ............ *Y02T 90/122* (2013.01); *Y02T 90/125* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 9,067,497 B2 * | 6/2015 | Ichikawa | B60L 11/1824 |
| 9,566,871 B2 * | 2/2017 | Konno | B60L 3/0069 |
| 2010/0190454 A1 | 7/2010 | Nagatomo | |
| 2013/0038272 A1 | 2/2013 | Sagata | |
| 2013/0234503 A1 | 9/2013 | Ichikawa | |
| 2014/0132210 A1 * | 5/2014 | Partovi | H02J 7/025 320/108 |
| 2014/0340027 A1 * | 11/2014 | Keeling | B60L 11/1829 320/108 |

FOREIGN PATENT DOCUMENTS

| | | |
|---|---|---|
| JP | 2002-017058 A | 1/2002 |
| JP | 2002-175591 A | 6/2002 |
| JP | 2004-150102 A | 5/2004 |
| JP | 2005-269593 A | 9/2005 |
| JP | 2010-183804 A | 8/2010 |
| JP | 2010-226945 A | 10/2010 |
| JP | 2013-051695 A | 3/2013 |
| WO | 2012/086048 A1 | 6/2012 |

\* cited by examiner

WIRELESS POWER-TRANSMITTING DEVICE AND SYSTEM

This application is a Continuation application based on a PCT Patent Application No. PCT/JP2014/066430, filed on Jun. 20, 2014, which claims priority the Japanese Patent Application No. 2013-152690, filed on Jul. 23, 2013. The contents of both the PCT Application and the Japanese Application are incorporated herein by reference.

TECHNICAL FIELD

The present disclosure relates to a wireless power-transmitting device and system.

BACKGROUND ART

In recent years, the development of wireless power-transmitting systems capable of wirelessly supplying electric power from a power-supplying side to a power-receiving side has been actively conducted. The wireless power-transmitting system is convenient since the wireless power-transmitting system can supply electric power without a connection using a wiring (a cable) between the power-supplying side and the power-receiving side. Therefore, the wireless power-transmitting system has promise for application to charging a battery mounted in a vehicle such as an electric vehicle (EV) or a plug-in hybrid electric vehicle (PHEV).

In the wireless power-transmitting system used for charging the battery mounted in the vehicle, for example, a wireless power-transmitting device is installed in each parking area (parking region) set within a parking facility, and electric power is wirelessly supplied to the vehicle parked in the parking area. In general, because a plurality of parking areas are provided in the parking facility and the vehicle can be parked in each parking area, it is necessary to associate the wireless power-transmitting device configured to supply electric power with the vehicle configured to receive the electric power from the wireless power-transmitting device.

The following Patent Document 1 discloses a power-transmitting system for wirelessly transmitting electric power to all indoor electric devices although this power-transmitting system is not used for charging a battery mounted in the vehicle. Specifically, in the power-transmitting system of the following Patent Document 1, the electric power is supplied to the indoor electric device through light, and the transmission and reception of necessary information to and from the electric device is performed through light. Alternatively, the electric power is supplied to the indoor electric device through radio waves, and the transmission and reception of necessary information to and from the electric device is performed through radio waves.

The following Patent Document 2 discloses a power-supplying system for wirelessly supplying electric power to a vehicle parked in a parking area. The power supply system of Patent Document 2 includes a power-receiving unit provided on a bottom of the vehicle, a power-transmitting unit embedded in the parking area, a transmitting unit and a receiving unit installed in the vehicle, and a transmitting unit and a receiving unit installed in the parking area. When a request-for-charging signal transmitted from the transmitting unit of the vehicle side is received by the receiving unit of the parking area side, charging to the battery mounted in the vehicle starts. In order to prevent positional misalignment between the power-transmitting unit and the power-receiving unit, the gain, directivity, and the like of an antenna constituting the transmitting unit or the receiving unit are appropriately adjusted. The transmitted and received signal is a radio wave signal or light signal.

The following Patent Document 3 discloses a wireless system for performing wireless communication between an in-vehicle device mounted in the vehicle and a communication antenna device of a roadside unit. The in-vehicle device is mounted on a dashboard inside the vehicle near the windshield of the vehicle. The communication antenna device of the roadside unit is attached to, for example, an upper portion of a pole so that a radiation surface of the communication antenna device inclines at a predetermined angle from a horizontal direction. Thereby, a desired communication region is formed on a road.

In the following Patent Document 4, a wireless charging system for charging a battery by wirelessly transmitting electric power from a charging device to a charging target device such as a vehicle is disclosed. The charging device includes a plurality of charging areas and a plurality of primary power-transmitting coils provided in each charging area. An area identifier (ID) for specifying a charging target device as a power transmission target is allocated for each charging area. The charging device transmits the allocated area ID to the charging target device. The charging target device replies to the transmitted area ID, so that the charging device identifies the charging target device as the power transmission target and wirelessly transmits electric power to the identified charging target device.

DOCUMENT OF RELATED ART

Patent Document

[Patent Document 1] Japanese Unexamined Patent Application, First Publication No. 2002-17058
[Patent Document 2] Japanese Unexamined Patent Application, First Publication No. 2010-226945
[Patent Document 3] Japanese Unexamined Patent Application, First Publication No. 2005-269593
[Patent Document 4] PCT International Publication No. WO 2012/086048

SUMMARY

Technical Problem

Most of the wireless power-transmitting systems used for charging a battery mounted in the vehicle control the supply of electric power by exchanging various types of information with the vehicle. For example, each of the start and stop of the supply of electric power for the vehicle is controlled based on each of a power supply start signal and a power supply stop signal from the vehicle, and an amount of electric power supplied to the vehicle is controlled based on an electric power request signal from the vehicle.

Thus, in the above-described wireless power-transmitting systems, it is necessary to provide a communication device for transmitting and receiving the above-described various types of information in both the wireless power-transmitting device of the power-supplying side and the vehicle of the power-receiving side. In the optical communication device disclosed in the above-described Patent Document 1, it is possible to prevent interference (crosstalk) by preventing fields of view of different communication devices from overlapping each other using high directivity of optical communication. Therefore, the association of the wireless power-transmitting device configured to supply electric power and the vehicle configured to receive the electric power from the wireless power-transmitting device is considered to be correctly performed.

However, in the wireless power-transmitting system used for charging the battery mounted in the vehicle, electric power is wirelessly transmitted from the power-transmitting coil of the wireless power-transmitting device installed on the ground to the power-receiving coil provided on a bottom of the vehicle. In addition, many parking facilities are provided outdoors, and roofs are not provided in many cases. Thus, when the above-descried communication devices are provided within a casing of the power-transmitting coil of the wireless power-transmitting device or within a casing of the power-receiving coil provided in the vehicle, or are provided in vicinity of the coils, there is a possibility that light may be obstructed by dust or the like attached through splashing of rain and the like, and therefore communication may become impossible.

The present disclosure is made in view of the above circumstances, and it is an object thereof to provide a wireless power-transmitting device and system that are not affected by rain or dust and can correctly perform association with a vehicle.

Solution to Problem

There is provided a wireless power-transmitting device, which includes a power-transmitting coil installed in a predefined parking region and wirelessly supplies electric power from the power-transmitting coil to a power-receiving coil of a vehicle parked in the parking region, the wireless power-transmitting device including: a receiving device configured to receive a signal for a power supply instruction transmitted through a windshield or a rear window of the vehicle; and a control device configured to control supply of electric power from the power-transmitting coil to the power-receiving coil of the vehicle based on the signal received by the receiving device.

There is provided a wireless power-transmitting system for wirelessly supplying electric power, the wireless power-transmitting system including: the above-described wireless power-transmitting device; and a vehicle which includes: a power-receiving coil configured to wirelessly receive electric power supplied from the power-transmitting coil of the wireless power-transmitting device; and a transmitting device configured to transmit the signal for the power supply instruction through at least one of the windshield and the rear window.

Advantageous Effects

According to the present disclosure, by providing the receiving device configured to receive a signal for a power supply instruction transmitted through the windshield or through the rear window of the vehicle and by controlling the supply of electric power from the power-transmitting coil to the power-receiving coil of the vehicle based on the signal received by the receiving device, there is an advantageous effect in that it is possible to correctly associate the wireless power-transmitting device configured to supply electric power with the vehicle configured to receive the electric power from the wireless power-transmitting device without being affected by rain or dust.

DESCRIPTION OF EMBODIMENTS

Hereinafter, a wireless power-transmitting device and system according to embodiments of the present disclosure will be described in detail with reference to the drawings.

First Embodiment

Figure 1:
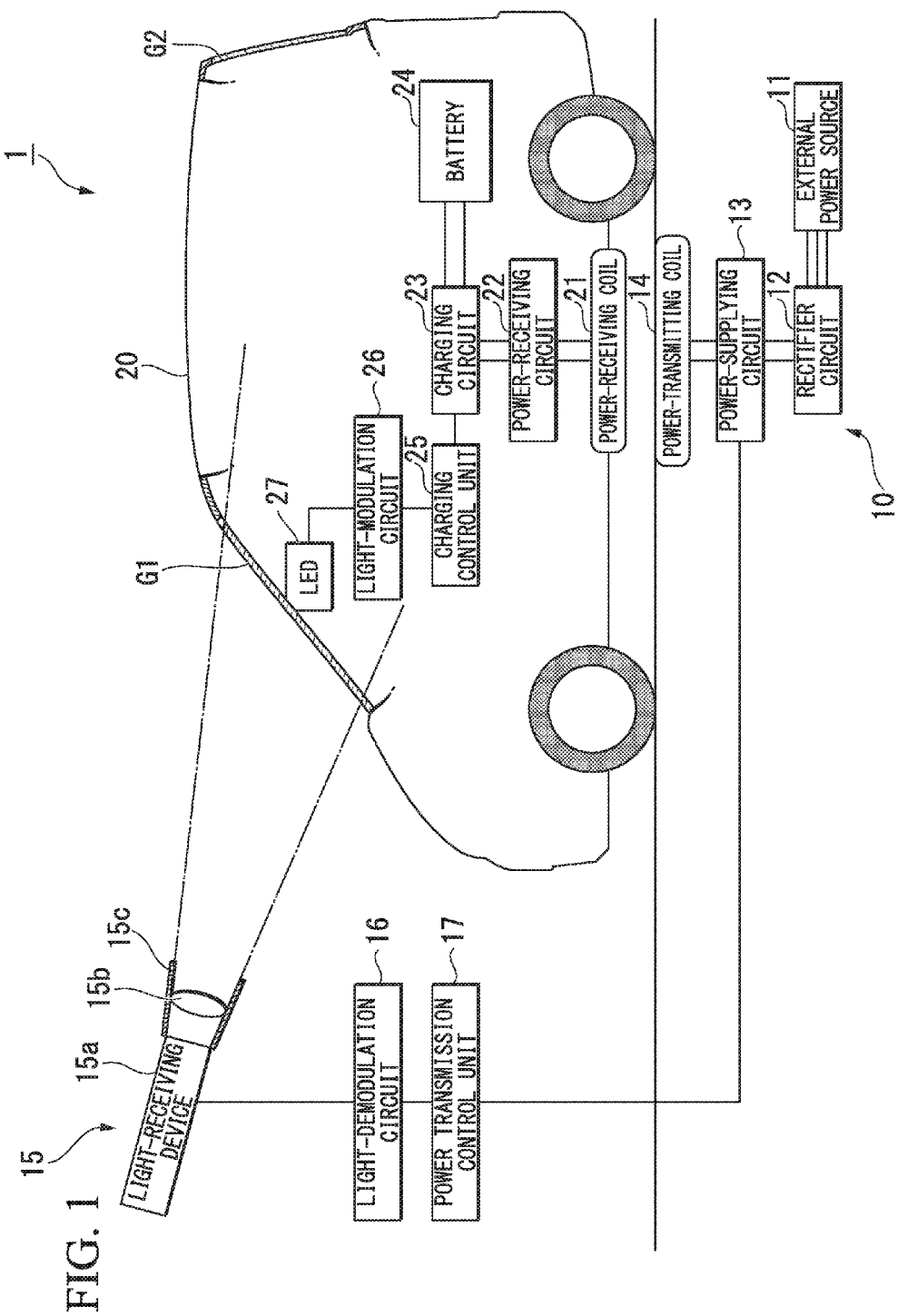
FIG. 1 is a block diagram showing a main part configuration of a wireless power-transmitting system according to a first embodiment of the present disclosure.

FIG. 1 is a block diagram showing a main part configuration of a wireless power-transmitting system according to the first embodiment of the present disclosure. As shown in FIG. 1, the wireless power-transmitting system 1 of this embodiment includes a wireless power-transmitting device 10 and a vehicle 20, and wirelessly supplies electric power from the wireless power-transmitting device 10 to the vehicle 20 while exchanging various types of information (command signals) between the wireless power-transmitting device 10 and the vehicle 20.

The wireless power-transmitting device 10 includes an external power source 11, a rectifier circuit 12, a power-supplying circuit 13, a power-transmitting coil 14, a light-receiving device 15 (receiving device), a light-demodulation circuit 16, and a power transmission control unit 17 (control device). The wireless power-transmitting device 10 receives a light signal (the above-described command signal) transmitted from the vehicle 20, generates electric power suitable for wireless power transmission to the vehicle 20, and wirelessly supplies electric power to the vehicle 20. The wireless power-transmitting device 10 is installed, for example, in a parking facility, and wirelessly supplies electric power to the vehicle 20 parked in a parking area (parking region) defined by a white line or the like. Among the above-described components from the external power source 11 to the power transmission control unit 17 constituting the wireless power-transmitting device 10, at least the power-transmitting coil 14 and the light-receiving device 15 are provided in each parking area. Details will be described below.

The external power source 11 has an output end connected to an input end of the rectifier circuit 12, and supplies the rectifier circuit 12 with alternating current (AC) power necessary to supply electric power to the vehicle 20. The external power source 11 is a system power source configured to supply, for example, three-phase AC power of 200 V, 400 V, or the like or single-phase AC power of 100 V. The rectifier circuit 12 has the input end connected to the external power source 11 and an output end connected to the power-supplying circuit 13. The rectifier circuit 12 converts the AC power supplied from the external power source 11 into direct current (DC) power, and outputs the DC power obtained by the conversion to the power-supplying circuit 13.

DC power source such as a fuel battery or a solar battery may be used as the external power source 11. When the DC power source is used, the rectifier circuit 12 may be omitted.

The power-supplying circuit 13 has an input end connected to the rectifier circuit 12 and an output end connected to the power-transmitting coil 14. The power-supplying circuit 13 converts the DC power from the rectifier circuit 12 into AC power, and outputs the AC power obtained by the conversion to the power-transmitting coil 14. Specifically, the power-supplying circuit 13 includes a resonance capacitor (not illustrated), the resonance capacitor together with the power-transmitting coil 14 constituting a power-supplying-side resonance circuit, converts the DC power from the rectifier circuit 12 into AC power (high-frequency power) having a higher frequency than the AC power of the external power source 11, and outputs the AC power to the power-transmitting coil 14 under control of the power transmission control unit 17. For example, the power-supplying circuit 13 is an inverter using a semiconductor switching element such as an insulated gate bipolar transistor (IGBT) or a power metal-oxide-semiconductor field-effect-transistor (MOSFET).

The power-transmitting coil 14 generates a magnetic field when the high-frequency power supplied from the power-supplying circuit 13 is applied, and wirelessly supplies electric power to the vehicle 20. Both ends of the power-transmitting coil 14 are connected to the output end of the power-supplying circuit 13, and the power-transmitting coil 14 is installed on the ground in an exposed state or in a molded state by a non-magnetic and non-conductive material such as plastic. Specifically, the power-transmitting coil 14 is, for example, a coil (solenoid coil) in which a lead such as a round wire or a rectangular wire is helicoidally wound in a predefined shape (for example, a square cylindrical shape) or a coil (circular coil) in which a lead such as a round wire or a rectangular wire is helicoidally wound within a plane.

The light-receiving device 15 receives a light signal from the vehicle 20 (a light signal emitted from a light-emitting diode (LED) 27 provided in the vehicle 20). Specifically, the light-receiving device 15 is installed at a position disposed obliquely in an upper front side with respect to the vehicle 20 parked in a parking area (hereinafter referred to as a head-in parking area) in which the head-in parking is expected so that the light-receiving device 15 looks into the inside of the vehicle through the windshield G1 of the vehicle 20. That is, the light-receiving device 15 is installed so as to look down at the vehicle 20 parked in the head-in parking area from the front, and receives a light signal emitted from the LED 27 and passing through the windshield G1 of the vehicle 20.

The light-receiving device 15 includes a light-receiving element 15a, a lens 15b, and a hood 15c, and a light reception area (field of view: reception area) of the light-receiving device 15 is limited so that only a light signal transmitted from the vehicle 20 parked in the head-in parking area is received. In FIG. 1, a boundary of the light reception area of the light-receiving device 15 is illustrated as a dashed-dotted line in order to facilitate understanding. This is to prevent a light signal transmitted from a vehicle parked in another head-in parking area from being received.

The light-receiving element 15a is, for example, a light-receiving element such as a photodiode. The lens 15b is provided to condense the light signal from the vehicle 20 onto the light-receiving element 15a. The hood 15c is provided to prevent the intrusion of rain, dust, or the like to the light-receiving device 15, and to limit the light-receiving area (field of view) of the light-receiving device 15.

The light-demodulation circuit 16 is a circuit which demodulates a signal received by the light-receiving device 15 (a signal modulated by a light-modulation circuit 26 to be described below). The power transmission control unit 17 controls the power-supplying circuit 13 to generate electric power to be supplied to the vehicle 20. Specifically, the power transmission control unit 17 controls the power-supplying circuit 13 to start the supply of electric power for the vehicle 20 when a signal indicating a power supply start from the vehicle 20 parked in the head-in parking area is input. The power transmission control unit 17 controls the power-supplying circuit 13 to stop the supply of electric power for the vehicle 20 when a signal indicating a power supply stop from the vehicle 20 parked in the head-in parking area is input.

The power transmission control unit 17 controls electric power to be supplied to the vehicle 20 in response to a signal indicating an electric power request from the vehicle 20 while the electric power is supplied to the vehicle 20. For example, when a signal for requesting an electric power of 1 [kW] is transmitted from the vehicle 20, the power-supplying circuit 13 is controlled so that the electric power supplied from the power-transmitting coil 14 to a power-receiving coil 21 of the vehicle 20 becomes 1 [kW]. The power transmission control unit 17 includes a central processing unit (CPU), a memory, and the like, and performs the above-described various types of controls based on a power transmission control program prepared in advance.

The vehicle 20 is a vehicle that is driven by a driver and travels on a road. For example, the vehicle 20 is an EV or a hybrid vehicle (HV) including a running motor as a power generation source. As shown in FIG. 1, the vehicle 20 includes the power-receiving coil 21, a power-receiving circuit 22, a charging circuit 23, a battery 24, a charging control unit 25, a light-modulation circuit 26, and the LED 27 (transmitting device). Although not shown in FIG. 1, components necessary for driving such as an operating handle, a brake, and a running motor are provided in the vehicle 20.

The power-receiving coil 21 is a coil (a solenoid coil or a circular coil) having the same coil dimensions or substantially the same coil dimensions as the power-transmitting coil 14, and is provided on the bottom of the vehicle 20. Both ends of the power-receiving coil 21 are connected to an input end of the power-receiving circuit 22, and the power-receiving coil 21 generates an electromotive force through electromagnetic induction when a magnetic field of the power-transmitting coil 14 is applied, and outputs the generated electromotive force to the power-receiving circuit 22.

The input end of the power-receiving circuit 22 is connected to the ends of the power-receiving coil 21, and an output end of the power-receiving circuit 22 is connected to an input end of the charging circuit 23. The power-receiving circuit 22 converts AC power supplied from the power-receiving coil 21 into DC power and outputs the DC power obtained through the conversion to the charging circuit 23. The power-receiving circuit 22 includes a resonance capacitor (not illustrated), and the resonance capacitor together with the power-receiving coil 21 constitutes a power-receiving-side resonance circuit. Further, the electrostatic capacitance of the resonance capacitor of the power-receiving circuit 22 is set so that a resonance frequency of the power-receiving-side resonance circuit is the same or substantially the same as a resonance frequency of the power-supplying-side resonance circuit in order to increase the efficiency of the wireless power transmission.

The input end of the charging circuit 23 is connected to the output end of the power-receiving circuit 22 and an output end of the charging circuit 23 is connected to an input end of the battery 24. The charging circuit 23 charges the battery 24 with electric power (DC power) from the power-receiving circuit 22 under the control of the charging control unit 25. The battery 24 is a rechargeable battery (for example, a secondary battery such as a lithium ion battery or a nickel-metal hydride battery) mounted in the vehicle 20, and supplies electric power to the running motor (not illustrated) or the like.

The charging control unit 25 measures an electric power supplied from the power-receiving circuit 22 to the charging circuit 23 and a state of charge (SoC) of the battery 24, and controls the charging circuit 23 based on the measured values. For example, the charging control unit 25 monitors an input voltage of the charging circuit 23 (an output voltage of the power-receiving circuit 22) and an input current of the charging circuit 23 (an output current of the power-receiving circuit 22), and calculates an electric power supplied from the power-receiving circuit 22 to the charging circuit 23 by using a monitored result, that is, by multiplying the input voltage of the charging circuit 23 by the input current of the charging circuit 23. The charging control unit 25 includes a CPU, a memory, and the like, and controls the charging circuit 23 based on a charging control program prepared in advance.

The light-modulation circuit 26 is a circuit that modulates a command signal output from the charging control unit 25. The LED 27 is installed in the front of the vehicle 20, and emits a light signal corresponding to the command signal modulated by the light-modulation circuit 26. Specifically, the LED 27 is attached onto a dashboard or an upper portion of the windshield G1 inside the vehicle 20, and installed at a visible position when viewed obliquely from an upper side above the vehicle 20. The windshield G1 is considered to be constantly cleaned so that the driver can view the outside of the vehicle from the inside of the vehicle, and a light signal emitted from the LED 27 is considered not to be obstructed. Accordingly, the LED 27 is installed in the front of the vehicle 20, and the light signal is transmitted through the windshield G1 from the LED 27.

Figure 2:
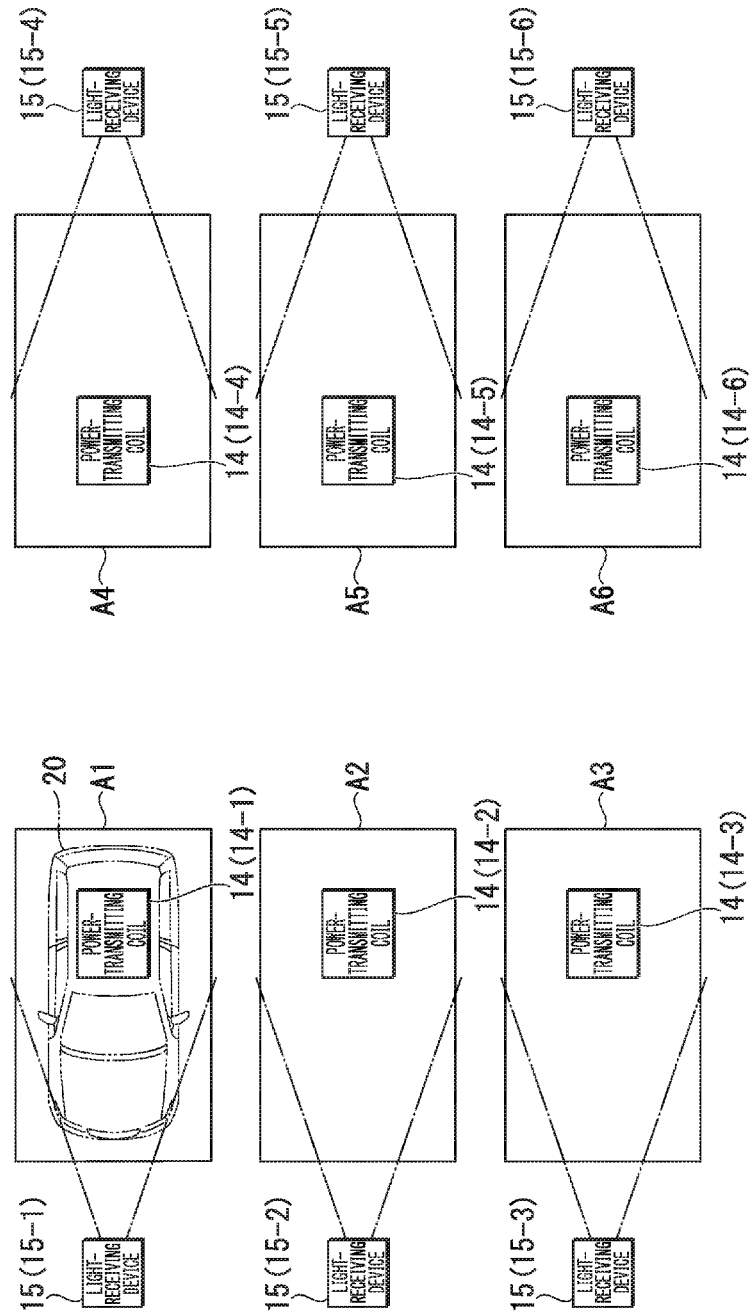
FIG. 2 is a top view showing an installation example of the wireless power-transmitting device in the first embodiment of the present disclosure.

FIG. 2 is a top view showing an installation example of the wireless power-transmitting device in the first embodiment of the present disclosure.

In order to simplify the illustration in FIG. 2, only the power-transmitting coils 14 (power-transmitting coils 14-1 to 14-6) and the light-receiving devices 15 (light-receiving devices 15-1 to 15-6) provided in the wireless power-transmitting device 10 are illustrated. As shown in FIG. 2, the power-transmitting coils 14-1 to 14-6 are installed within a plurality of head-in parking areas A1 to A6 provided in the parking facility, respectively.

As shown in FIG. 1, the power-receiving coil 21 of the vehicle 20 is provided on the rear half of the vehicle 20. Thus, the power-transmitting coils 14-1 to 14-6 are provided on one end sides (sides through which the vehicle 20 enter during parking) from the centers of the head-in parking areas A1 to A6, respectively, in accordance with the power-receiving coil 21 as shown in FIG. 2. That is, when the vehicle 20 is parked front-end first in the head-in parking areas A1 to A6, the power-transmitting coils 14-1 to 14-6 are installed at positions capable of overlapping the power-receiving coil 21 provided in the vehicle 20 in a plan view.

As shown in FIG. 2, the light-receiving devices 15-1 to 15-6 are installed in association with the power-transmitting coils 14-1 to 14-6 for the head-in parking areas A1 to A6, respectively. Specifically, the light-receiving devices 15-1 to 15-6 are installed at positions separated by a predefined distance from the head-in parking areas A1 to A6 on the other end sides (sides opposing the above-described one end sides) of the head-in parking areas A1 to A6. That is, when the vehicle 20 is parked front-end first in the head-in parking areas A1 to A6, the light-receiving devices 15-1 to 15-6 are installed so as to look into the inside of the vehicle through the windshield G1 of the vehicle 20. As shown in FIG. 2, the light-receiving devices 15-1 to 15-6 are configured so that light reception areas (fields of view) do not overlap each other.

Figure 3A:
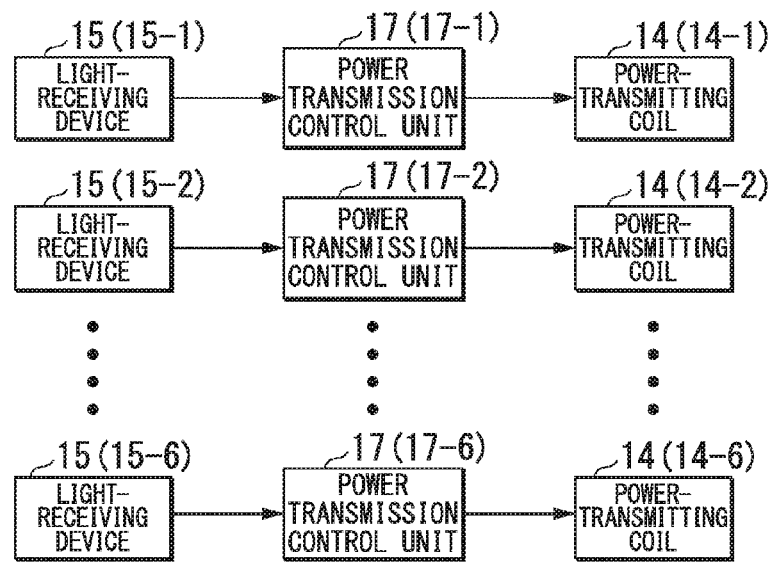
FIG. 3A is a diagram showing a configuration example of a control system of the wireless power-transmitting device in the first embodiment of the present disclosure.
Figure 3B:
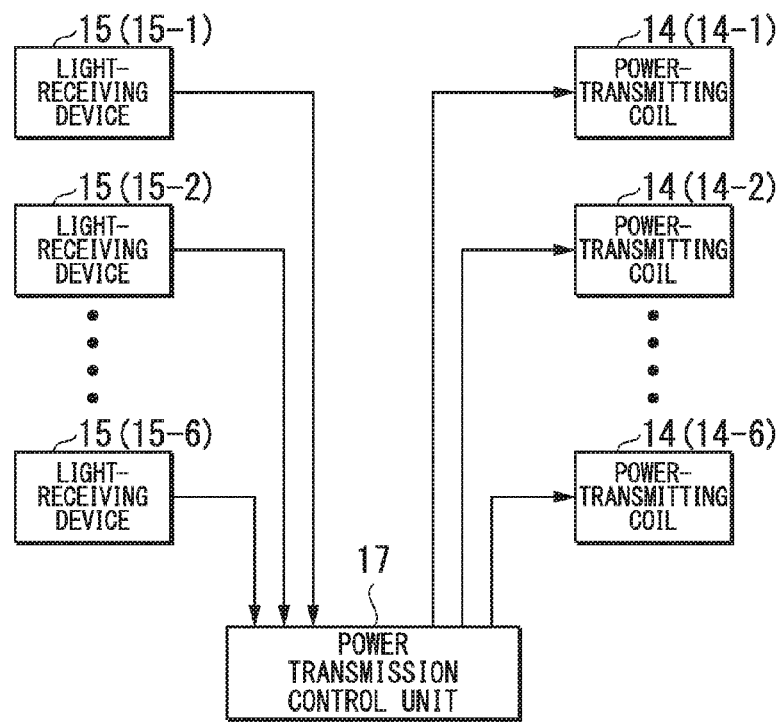
FIG. 3B is a diagram showing another configuration example of the control system of the wireless power-transmitting device in the first embodiment of the present disclosure.

FIGS. 3A and 3B are diagrams showing configuration examples of a control system of the wireless power-transmitting device in the first embodiment of the present disclosure. In the control system illustrated in FIG. 3A, a power transmission control unit 17 (17-1 to 17-6) is provided for each of the head-in parking areas A1 to A6, and power transmission control in each of the head-in parking areas A1 to A6 is individually performed. On the other hand, in the control system illustrated in FIG. 3B, one power transmission control unit 17 common to all the head-in parking areas A1 to A6 is provided, and power transmission control in the head-in parking areas A1 to A6 is collectively performed by the power transmission control unit 17.

However, in any of the control systems illustrated in FIGS. 3A and 3B, the control (power transmission control) of electric power supplied from the power-transmitting coils 14-1 to 14-6 is performed based on light signals received by the corresponding light-receiving devices 15-1 to 15-6. For example, in any of the control systems illustrated in FIGS. 3A and 3B, the control of electric power supplied from the power-transmitting coil 14-1 is performed based on a light signal received by the light-receiving device 15-1 and the control of electric power supplied from the power-transmitting coil 14-2 is performed based on a light signal received by the light-receiving device 15-2.

That is, in the control system illustrated in FIG. 3A, the power-transmitting coil 14, the light-receiving device 15, and the power transmission control unit 17 are provided in association with each of the head-in parking areas A1 to A6, and the power transmission control unit 17 controls the supply of electric power from the corresponding power-transmitting coil 14 based on a light signal received by the corresponding light-receiving device 15. On the other hand, in the control system shown in FIG. 3B, the power-transmitting coil 14 and the light-receiving device 15 are provided in association with each of the head-in parking areas A1 to A6, and the power transmission control unit 17 controls the supply of electric power from the power-transmitting coil 14 corresponding to the light-receiving device 15 which receives a light signal.

Next, an operation of the wireless power-transmitting system 1 having the above-described configuration will be described. It is assumed that the driver drives the vehicle 20, enters the head-in parking area A1 shown in FIG. 2 and parks the vehicle 20 front-end first. In order to simplify description, it is assumed that the power-transmitting coil 14 (power-transmitting coil 14-1) installed in the head-in parking area A1 and the power-receiving coil 21 provided in the vehicle 20 parked front-end first in the head-in parking area A1 are in an overlapping state in a plan view (that is, a state in which the power-transmitting coil 14 and the power-receiving coil 21 almost face each other and wireless power transmission is efficiently performed).

When the driver issues a charging instruction to the vehicle 20 after parking the vehicle 20, a command signal indicating a charging start is output from the charging control unit 25 of the vehicle 20. The command signal output from the charging control unit 25 is input to the light-modulation circuit 26 and modulated by the light-modulation circuit 26, and is output to the LED 27. Thereby, a light signal corresponding to the modulated command signal is emitted from the LED 27.

The light signal emitted from the LED 27 passes through the windshield G1 of the vehicle 20 and is transmitted outside the vehicle 20. The transmitted light signal is received by the light-receiving device 15 (light-receiving device 15-1) disposed above a front side upper portion of the vehicle 20. The light signal received by the light-receiving device 15 (light-receiving device 15-1) is input to the light-demodulation circuit 16 and demodulated by the light-demodulation circuit 16, and is output to the power transmission control unit 17 (or to the power transmission control unit 17-1 shown in FIG. 3A). Then, the power-supplying circuit 13 is controlled by the power transmission control unit 17 (or by the power transmission control unit 17-1), and the supply of electric power (wireless power transmission) to the power-receiving coil 21 provided in the vehicle 20 from the power-transmitting coil 14 (power-transmitting coil 14-1) installed in the head-in parking area A1 is started.

The electric power (AC power) wirelessly supplied to the power-receiving coil 21 of the vehicle 20 is converted into DC power by the power-receiving circuit 22, and the DC power is output to the charging circuit 23. Then, the charging circuit 23 is controlled by the charging control unit 25 and the battery 24 is charged with the electric power (DC power) from the power-receiving circuit 22. While the battery 24 is charged, a command signal indicating a necessary amount of electric power (for example, a command signal for requesting an electric power of 1 [kW]) is output from the charging control unit 25.

Similar to the command signal previously described, this command signal is modulated by the light-modulation circuit 26 and output to the LED 27. A light signal corresponding to the modulated command signal is emitted from the LED 27. The light signal emitted from the LED 27 passes through the windshield G1 and is transmitted to the outside, and is received by the light-receiving device 15 (light-receiving device 15-1). The light signal received by the light-receiving device 15 (light-receiving device 15-1) is input to the light-demodulation circuit 16 and demodulated by the light-demodulation circuit 16, and is output to the power transmission control unit 17 (or to the power transmission control unit 17-1). Thereby, the charging circuit 23 is controlled so that an amount of electric power to be supplied from the power-transmitting coil 14 (power-transmitting coil 14-1) installed in the head-in parking area A1 to the power-receiving coil 21 provided in the vehicle 20 matches an amount of electric power indicated by the above-described command signal.

There may be a case in which another vehicle X is parked in any of the other head-in parking areas A2 to A6 and another command signal corresponding to electric power required by the other vehicle X is transmitted from an LED provided inside the other vehicle X. Even in this case, the light-receiving device 15-1 receives only the light signal emitted from the LED 27 provided inside the vehicle 20 because the head-in parking areas A2 to A6 are out of a light reception area (field of view) of the light-receiving device 15-1. Thus, the power-transmitting coil 14-1 supplies electric power to the power-receiving coil 21 of the vehicle 20 in response to the command signal from the vehicle 20 parked in the head-in parking area A1, and a command signal from the other vehicle X is not confused with the command signal from the vehicle 20.

As described above, in this embodiment, the light-receiving devices 15 (light-receiving devices 15-1 to 15-6) configured to receive a light signal emitted from the LED 27 of the vehicle 20 parked front-end first in the head-in parking areas A1 to A6 and passing through the windshield G1 are provided, and the supply of electric power from the power-transmitting coils 14 (power-transmitting coils 14-1 to 14-6) to the power-receiving coil 21 of the vehicle 20 is controlled based on the light signal received by the light-receiving device 15. Thus, a situation in which the light signal transmitted from the LED 27 is not received by the light-receiving device 15 due to an influence of rain, dust, or the like is unlikely to occur, and the power-transmitting coil 14 configured to supply electric power and the vehicle 20 configured to receive electric power from the power-transmitting coil 14 can be correctly associated.

Second Embodiment

Figure 4:
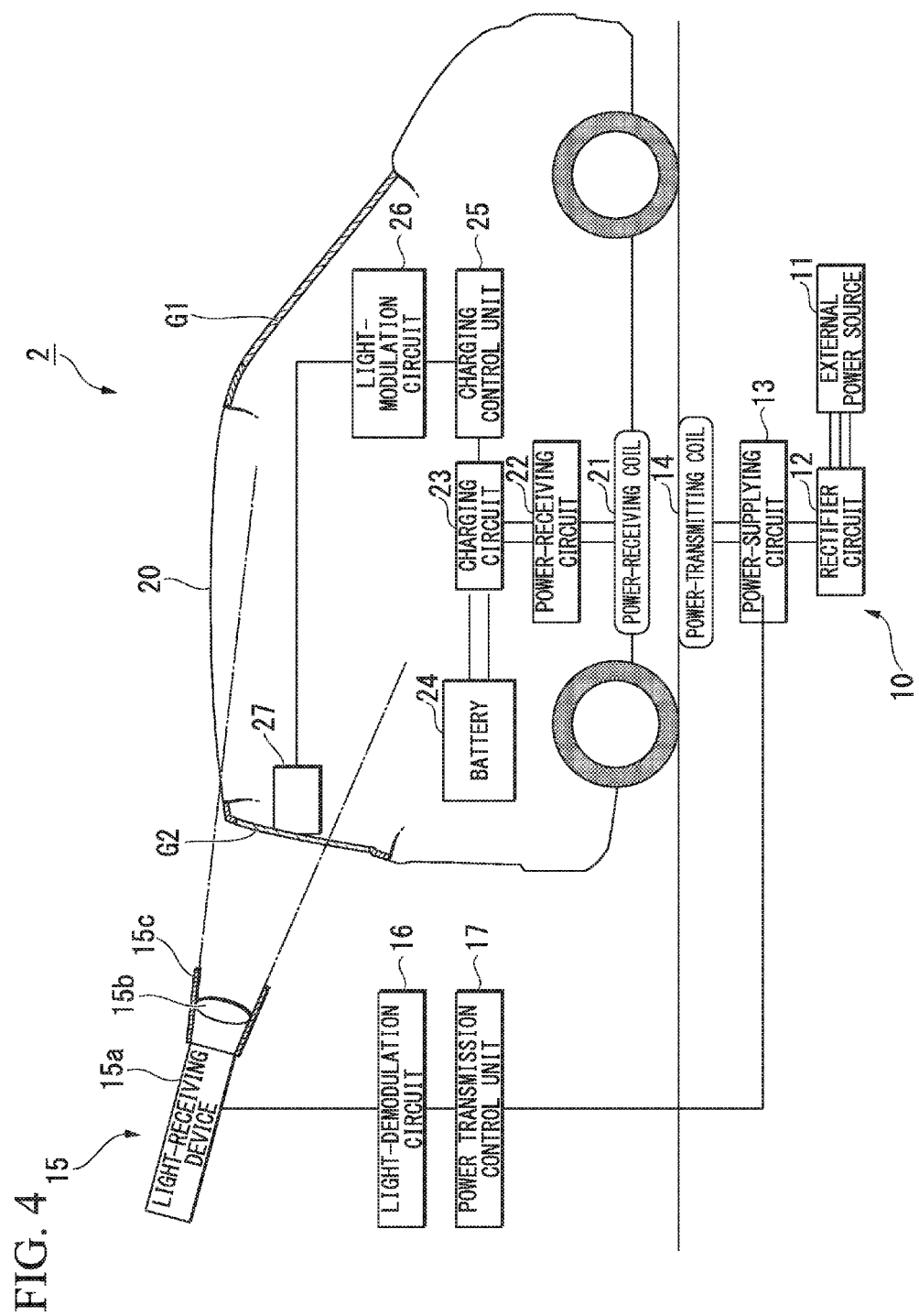
FIG. 4 is a block diagram showing a main part configuration of a wireless power-transmitting system according to a second embodiment of the present disclosure.

FIG. 4 is a block diagram showing a main part configuration of a wireless power-transmitting system according to the second embodiment of the present disclosure. Similar to the wireless power-transmitting system 1 of the first embodiment, the wireless power-transmitting system 2 of this embodiment includes a wireless power-transmitting device 10 and a vehicle 20, and wirelessly supplies electric power from the wireless power-transmitting device 10 to the vehicle 20 while performing the exchange of various types of information (command signals) between the wireless power-transmitting device 10 and the vehicle 20. While the wireless power-transmitting system 1 of the first embodiment corresponds to the case in which the vehicle 20 is parked front-end first, the wireless power-transmitting system 2 of this embodiment corresponds to a case in which the vehicle 20 is parked rear-end first.

As shown in FIG. 4, in the wireless power-transmitting system 2 of this embodiment, an LED 27 is installed in the rear of the vehicle 20, and a light signal emitted from the LED 27 passes through a rear window G2 and is transmitted to the outside. Specifically, the LED 27 is attached to an upper portion or a lower portion of the rear window G2 inside the vehicle 20, and installed at a visible position when viewed obliquely from a rear upper side above the vehicle 20. Similar to a windshield G1, the rear window G2 is considered to be constantly cleaned so that the driver can view the outside of the vehicle from the inside of the vehicle, and a light signal emitted from the LED 27 is considered not to be obstructed.

In addition, in the wireless power-transmitting system 2 of this embodiment, the light-receiving device 15 is installed at a position disposed obliquely in an upper rear side with respect to the vehicle 20 parked in a parking area (hereinafter referred to as a back-in parking area) in which the back-in parking is expected so that the light-receiving device 15 looks into the inside of the vehicle through the rear window G2 of the vehicle 20. That is, the light-receiving device 15 is installed so as to look down at the vehicle 20 parked in the back-in parking area from the rear, and receives a light signal emitted from the LED 27 and passing through the rear window G2 of the vehicle 20.

Figure 5:
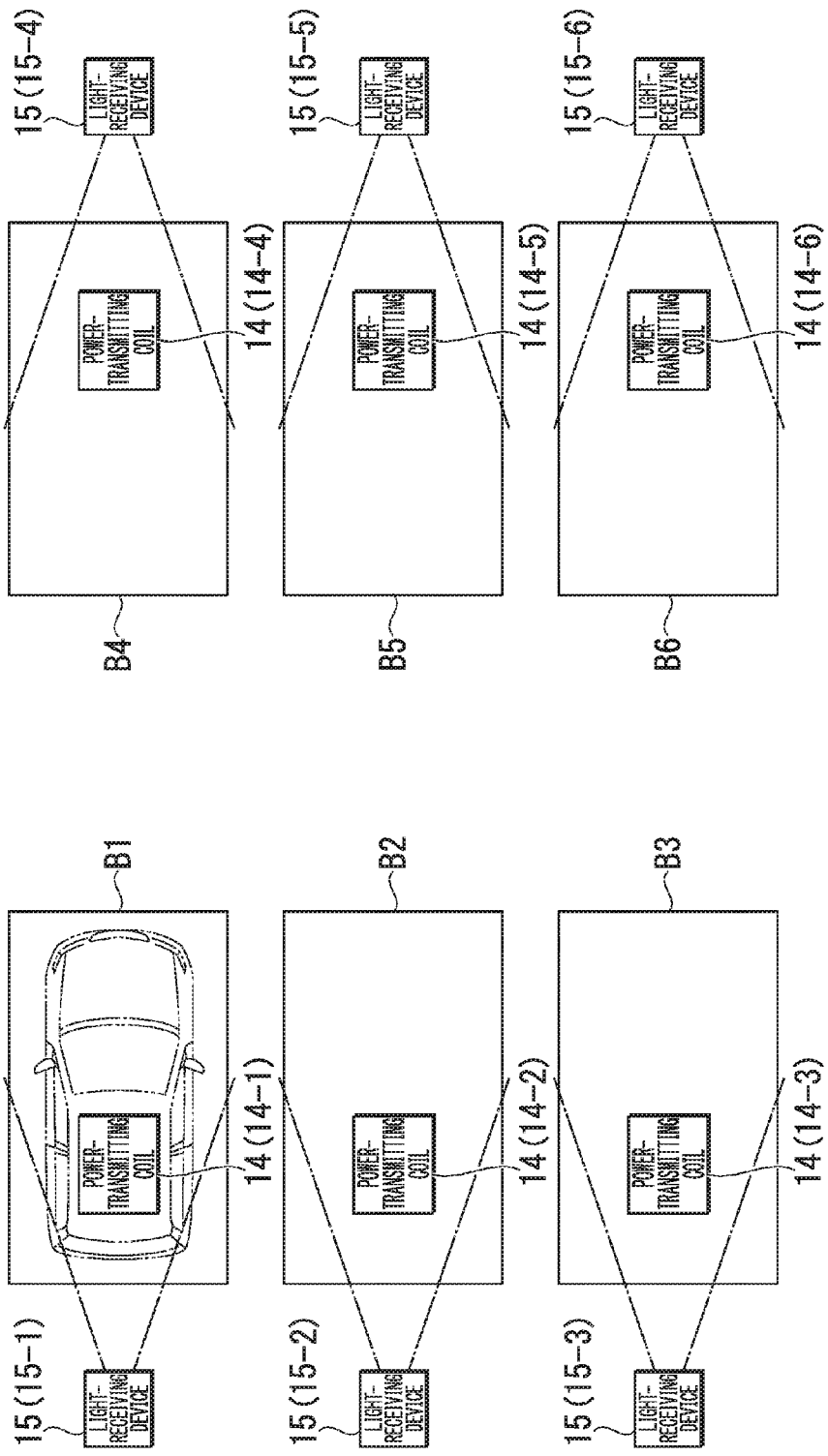
FIG. 5 is a top view showing an installation example of the wireless power-transmitting device in the second embodiment of the present disclosure.

FIG. 5 is a top view showing an installation example of a wireless power-transmitting device in the second embodiment of the present disclosure.

In FIG. 5, as in FIG. 2, only power-transmitting coils 14 (power-transmitting coils 14-1 to 14-6) and light-receiving devices 15 (light-receiving devices 15-1 to 15-6) provided in a wireless power-transmitting device 10 are illustrated. As shown in FIG. 5, the power-transmitting coils 14-1 to 14-6 are installed within a plurality of back-in parking areas B1 to B6 provided in a parking facility, respectively.

In the back-in parking areas B1 to B6, the power-transmitting coils 14-1 to 14-6 are provided on the other end sides (sides opposing one end sides through which the vehicle 20 enter during parking) from the centers of the back-in parking areas B1 to B6, respectively. This is because the position of the power-receiving coil 21 during parking of the vehicle 20, which is parked rear-end first, is considered. In addition, as shown in FIG. 5, the light-receiving devices 15-1 to 15-6 are installed in association with the power-transmitting coils 14-1 to 14-6 for the back-in parking areas B1 to B6, respectively. Installation positions of the light-receiving devices 15-1 to 15-6 are similar to installation positions of the light-receiving devices 15-1 to 15-6 shown in FIG. 2.

The wireless power-transmitting system 2 of this embodiment is different from the wireless power-transmitting system 1 of the first embodiment in that the wireless power-transmitting system 2 corresponds to the case in which the vehicle 20 is parked rear-end first, and a basic configuration and operation of this embodiment are similar to those of the first embodiment. Further, configuration examples shown in FIGS. 3A and 3B may also be applied to a configuration of a control system of the wireless power-transmitting device 10 of this embodiment. Therefore, the detailed description of the operation of the wireless power-transmitting system 2 will be omitted.

As described above, in this embodiment, the light-receiving devices 15 (light-receiving devices 15-1 to 15-6) configured to receive a light signal emitted from the LED 27 of the vehicle 20 parked rear-end first in the back-in parking areas B1 to B6 and passing through the rear window G2 are provided, and the supply of electric power from the power-transmitting coils 14 (power-transmitting coils 14-1 to 14-6) to the power-receiving coil 21 of the vehicle 20 is controlled based on the light signal received by the light-receiving device 15. Thus, as in the first embodiment, a situation in which the light signal transmitted from the LED 27 is not received by the light-receiving device 15 due to an influence of rain, dust, or the like is unlikely to occur, and the power-transmitting coil 14 configured to supply electric power and the vehicle 20 configured to receive electric power from the power-transmitting coil 14 can be correctly associated.

Third Embodiment

Figure 6:
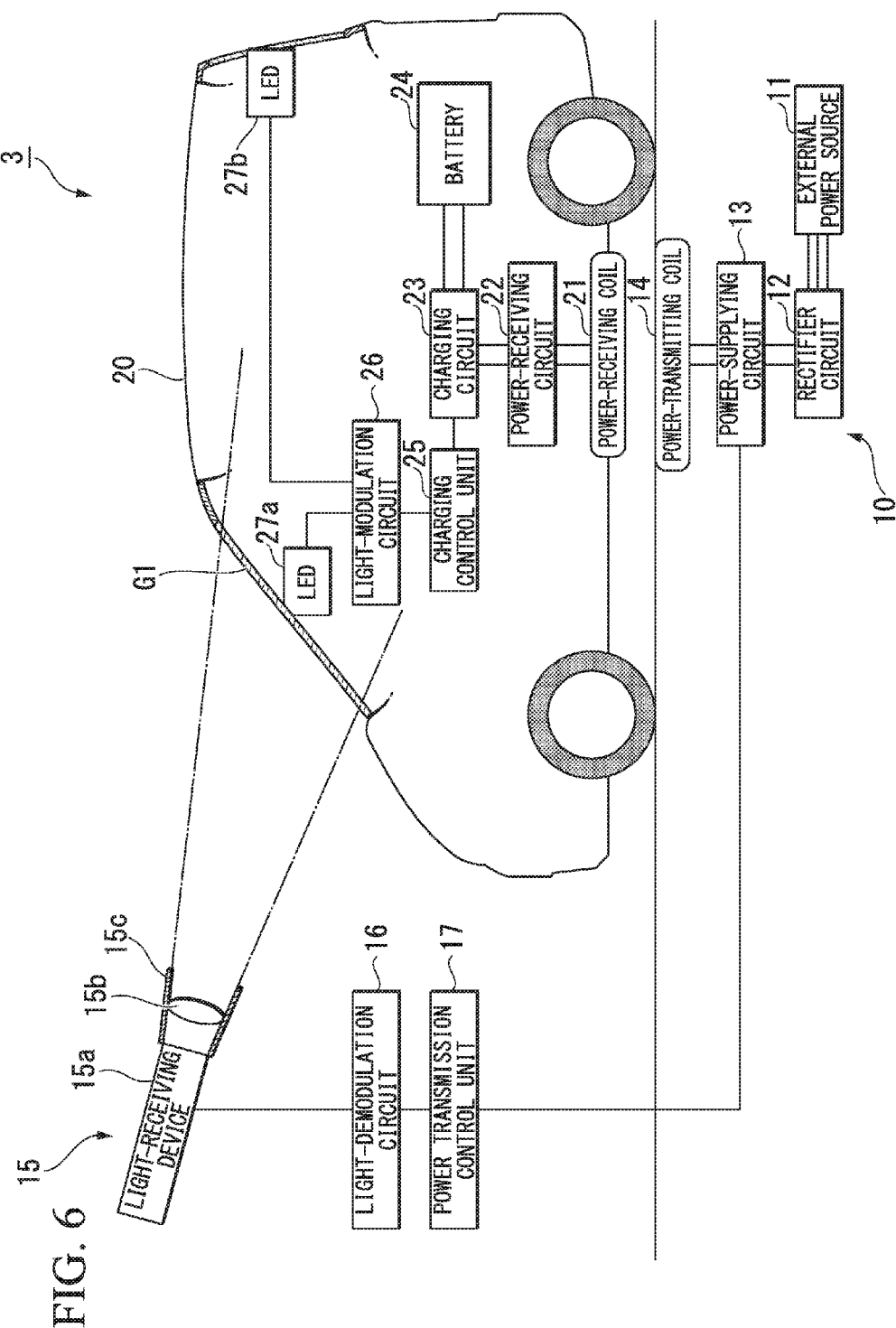
FIG. 6 is a block diagram showing a main part configuration of a wireless power-transmitting system according to a third embodiment of the present disclosure.

FIG. 6 is a block diagram showing a main part configuration of a wireless power-transmitting system according to the third embodiment of the present disclosure. Similar to the wireless power-transmitting system 1 of the first embodiment, the wireless power-transmitting system 3 of this embodiment includes a wireless power-transmitting device 10 and a vehicle 20, and wirelessly supplies electric power from the wireless power-transmitting device 10 to the vehicle 20 while performing the exchange of various types of information (command signals) between the wireless power-transmitting device 10 and the vehicle 20. However, the wireless power-transmitting system 3 of this embodiment handles both the case in which the vehicle 20 is parked front-end first and the case in which the vehicle 20 is parked rear-end first.

As shown in FIG. 6, in the wireless power-transmitting system 3 of this embodiment, an LED 27a (first transmitting device) and an LED 27b (second transmitting device) are installed in the front and in the rear of the vehicle 20, respectively. Therefore, a light signal emitted from the LED 27a passes through a windshield G1 and is transmitted to the outside, and a light signal emitted from the LED 27b passes through a rear window G2 and is transmitted to the outside.

The LED 27a is similar to the LED 27 provided in the vehicle 20 in the first embodiment, and the LED 27b is similar to the LED 27 provided in the vehicle 20 in the second embodiment. However, the LEDs 27a and 27b emit light signals having different wavelengths from each other.

For example, the LED 27a emits a light signal of a red wavelength and the LED 27b emits a light signal of a blue wavelength. The LEDs 27a and 27b emitting the light signals having different wavelengths from each other are used to determine whether the vehicle 20 is parked front-end first or whether the vehicle 20 is parked rear-end first.

In the wireless power-transmitting system 3 of this embodiment, a light-receiving device 15 similar to the light-receiving device 15 described in the first and second embodiments is installed. However, the light-receiving device 15 installed in this embodiment, for example, includes a color filter, and can receive either one of the light signals having different wavelengths emitted from the LEDs 27a and 27b. For example, the light-receiving device 15 includes either of two types of color filters: a color filter which transmits the light of the red wavelength without transmitting the light of the blue wavelength and a color filter which transmits the light of the blue wavelength without transmitting the light of the red wavelength.

Figure 7:
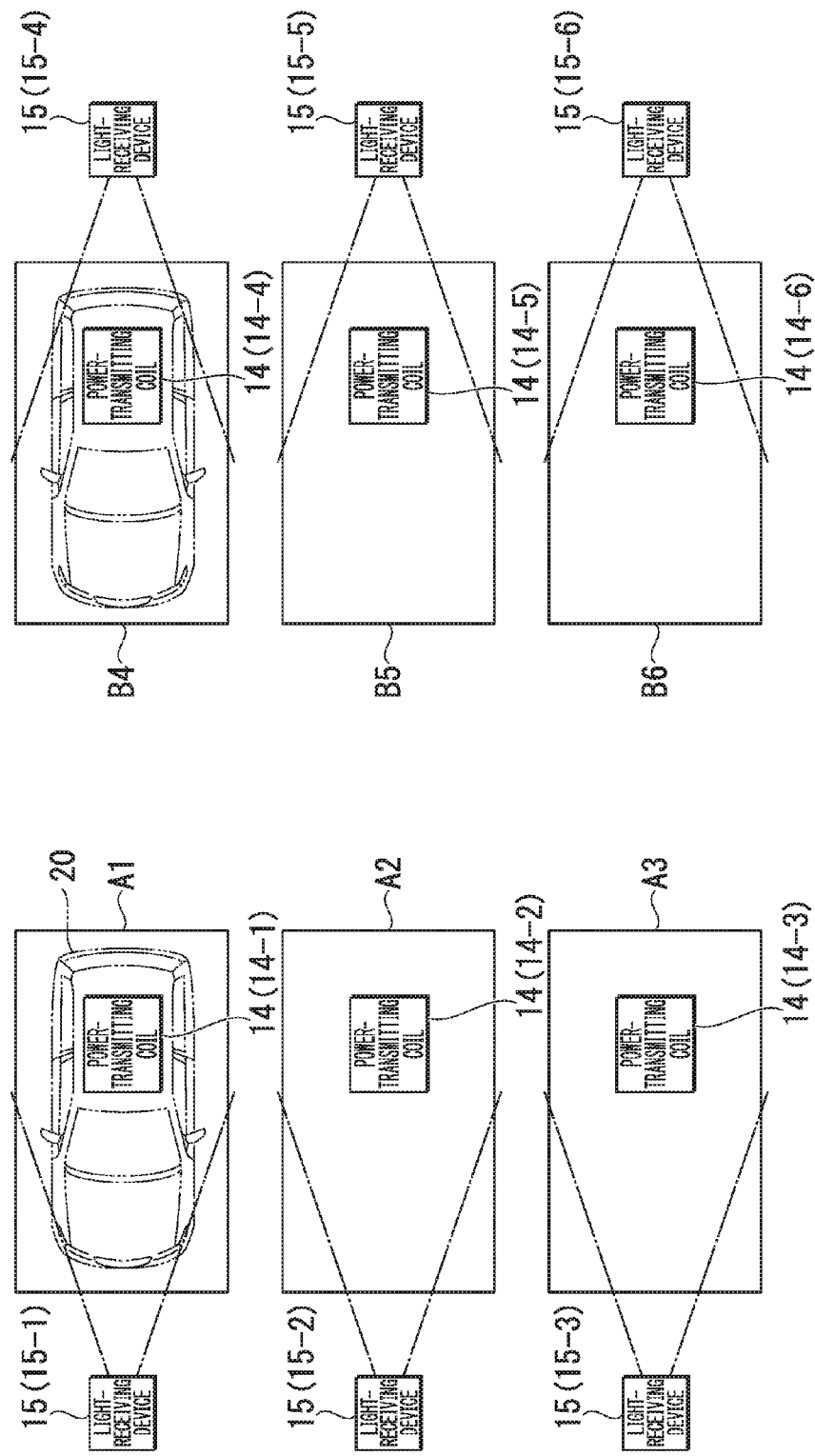
FIG. 7 is a top view showing an installation example of the wireless power-transmitting device in the third embodiment of the present disclosure.

FIG. 7 is a top view showing an installation example of a wireless power-transmitting device in the third embodiment of the present disclosure.

In FIG. 7, as in FIGS. 2 and 5, only the power-transmitting coils 14 (power-transmitting coils 14-1 to 14-6) and the light-receiving devices 15 (light-receiving devices 15-1 to 15-6) provided in the wireless power-transmitting device 10 are illustrated. In an example shown in FIG. 7, head-in parking areas A1 to A3 shown in FIG. 2 and back-in parking areas B4 to B6 shown in FIG. 5 are provided in a parking facility.

The power-transmitting coils 14-1 to 14-3 installed within the head-in parking areas A1 to A3 are installed on one end sides (sides through which the vehicle 20 enter during parking) from the centers of the head-in parking areas A1 to A3, respectively. On the other hand, the power-transmitting coils 14-4 to 14-6 installed within the back-in parking areas B4 to B6 are installed on the other end sides (sides opposing the one end sides through which the vehicle 20 enter during parking) from the centers of the back-in parking areas B4 to B6, respectively.

The light-receiving devices 15-1 to 15-3 include color filters which transmit light emitted from the LED 27a without transmitting light emitted from the LED 27b, and the light-receiving devices 15-4 to 15-6 include color filters which transmit light emitted from the LED 27b without transmitting light emitted from the LED 27a. For example, when the LED 27a emits a light signal of a red wavelength and the LED 27b emits a light signal of a blue wavelength, the light-receiving devices 15-1 to 15-3 include a red color filter, and the light-receiving devices 15-4 to 15-6 include a blue color filter.

When the vehicle 20 is correctly parked front-end first in one of the head-in parking areas A1 to A3, a light signal emitted from the LED 27a and passing through the windshield G1 passes through the color filter provided in the light-receiving device 15 (one of the light-receiving devices 15-1 to 15-3) corresponding to the head-in parking area in which the vehicle 20 is parked, and is received by the one of the light-receiving devices 15-1 to 15-3. In addition, when the vehicle 20 is correctly parked rear-end first in one of the back-in parking areas B4 to B6, a light signal emitted from the LED 27b and passing through the rear window G2 passes through the color filter provided in the light-receiving device 15 (one of the light-receiving devices 15-4 to 15-6) corresponding to the back-in parking area in which the vehicle 20 is parked, and is received by the one of the light-receiving devices 15-4 to 15-6.

In this case, according to the same operation as that of the first embodiment in the head-in parking areas A1 to A3 and the same operation as that of the second embodiment in the back-in parking areas B4 to B6, wireless power transmission from the wireless power-transmitting device 10 to the vehicle 20 is performed.

On the other hand, when the vehicle 20 is parked rear-end first in the head-in parking areas A1 to A3, a light signal emitted from the LED 27b and passing through the rear window G2 (a light signal having a different wavelength from a light signal emitted from the LED 27a) does not pass through the color filters provided in the light-receiving devices 15-1 to 15-3, and is not received by the light-receiving devices 15-1 to 15-3. In addition, when the vehicle 20 is parked front-end first in the back-in parking areas B4 to B6, a light signal emitted from the LED 27a and passing through the windshield G1 (a light signal having a different wavelength from a light signal emitted from the LED 27b) does not pass through the color filters provided in the light-receiving devices 15-4 to 15-6, and is not received by the light-receiving devices 15-4 to 15-6.

Because a light signal having a different wavelength from a light signal to be received when the vehicle 20 is parked in a correct direction is not received by the light-receiving devices 15-1 to 15-6 as described above, electric power is prevented from being supplied to the vehicle 20 parked rear-end first in the head-in parking areas A1 to A3 or the vehicle 20 parked front-end first in the back-in parking areas B4 to B6.

The wireless power-transmitting system 3 of this embodiment handles both the case in which the vehicle 20 is parked front-end first and the case in which the vehicle 20 is parked rear-end first, and a basic configuration and operation of this embodiment are similar to those of the first and second embodiments. Further, configuration examples shown in FIGS. 3A and 3B may also be applied to a configuration of a control system of the wireless power-transmitting device 10 of this embodiment. Thus, the detailed description of the operation of the wireless power-transmitting system 3 will be omitted.

As described above, in this embodiment, the light-receiving devices 15 (light-receiving devices 15-1 to 15-3) configured to receive a light signal emitted from the LED 27a of the vehicle 20 parked front-end first in the head-in parking areas A1 to A3 and passing through the windshield G1 are provided, and the supply of electric power from the power-transmitting coils 14 (power-transmitting coils 14-1 to 14-3) to the power-receiving coil 21 of the vehicle 20 is controlled based on the light signal received by the light-receiving device 15. In addition, in this embodiment, the light-receiving devices 15 (light-receiving devices 15-4 to 15-6) configured to receive a light signal emitted from the LED 27b of the vehicle 20 parked rear-end first in the back-in parking areas B4 to B6 and passing through the rear window G2 are provided, and the supply of electric power from the power-transmitting coils 14 (power-transmitting coils 14-4 to 14-6) to the power-receiving coil 21 of the vehicle 20 is controlled based on the light signal received by the light-receiving device 15. Thus, as in the first and second embodiments, a situation in which the light signals transmitted from the LEDs 27a and 27b are not received by the light-receiving device 15 due to an influence of rain, dust, or the like is unlikely to occur, and the power-transmitting coil 14 configured to supply electric power and the vehicle 20 configured to receive electric power from the power-transmitting coil 14 can be correctly associated.

In addition, in this embodiment, because a configuration is made so that light signal having a different wavelength from light signal to be received when the vehicle 20 is parked in a correct direction is not received by the light-receiving devices 15-1 to 15-6, it is possible to prevent electric power from being wirelessly supplied to the vehicle 20 when the direction of parking of the vehicle is incorrect.

Although the wireless power-transmitting device and system according to the embodiments of the present disclosure have been described above, the present disclosure is not limited to the above-described embodiments and a change can be freely made within the scope of the present disclosure. For example, an example in which a light signal is transmitted from the windshield G1 or from the rear window G2 of the vehicle 20 has been described in the above-described embodiment. However, directional antennas may be provided in place of the LEDs 27, 27a, and 27b so that high-frequency radio wave signals, for example, radio wave signals of frequencies of GHz bands or higher, are transmitted. Further, it is only necessary to set the directivity of the directional antenna so that a receiving device receives only a radio wave signal transmitted from a vehicle parked in a parking area set as a field of view of the receiving device, and that a radio wave signal transmitted from a vehicle parked in a parking area outside the field of view of the receiving device does not affect reception (a level of this radio wave signal in the receiving device becomes a level of noise or less).

The LED 27 or the directional antenna described above may be attached to the dashboard, the windshield G1, or the rear window G2 in a fixed state, for example, using a suction cup. By using the suction cup, it is possible to dispose the LED 27 or the directional antenna in the front or the rear if necessary. In addition, the LED 27, 27a, or 27b or the directional antenna may be provided inside the same cover as that of a headlight or a brake lamp.

In the first to third embodiments, glass may be provided on a front surface of the lens 15b provided in the light-receiving devices 15 (15-1 to 15-6). Raindrops adhered to the glass may be eliminated by a wiper, by an air purge or the like, or the clouding of the glass may be prevented by an embedded heater.

Although it is assumed that the power-receiving coil 21 of the vehicle 20 is provided on the rear half of the vehicle 20 in the first to third embodiments, the power-receiving coil 21 may be provided at any position of the bottom of the vehicle 20 as long as a position of the power-receiving coil with respect to the vehicle is uniform in all vehicles and the power-transmitting coil is provided so that the power-transmitting coil faces the power-receiving coil when the vehicle is parked.

Although a magnetic resonance method is adopted as a wireless power-transmitting method in the above-described embodiments, another method such as an electromagnetic induction method may be adopted. As long as wireless power transmission is possible between the power-transmitting coil and the power-receiving coil, the power-transmitting coil and the power-receiving coil may be coils other than solenoid or circular coils and shapes and sizes of the coils and other coil characteristics may be arbitrary.

INDUSTRIAL APPLICABILITY

According to the present disclosure, it is possible to provide a wireless power-transmitting device and system that are not affected by rain or dust and can correctly perform association with a vehicle.

The invention claimed is:

1. A wireless power-transmitting device, which includes a power-transmitting coil installed in a predefined parking region and wirelessly supplies electric power from the power-transmitting coil to a power-receiving coil of a vehicle parked in the parking region, the wireless power-transmitting device comprising:
a receiving device configured to:
receive a first signal for a power supply instruction transmitted through a windshield when the parking region is a head-in parking area, and
receive a second signal for the power supply instruction transmitted through a rear window of the vehicle when the parking region is a back-in parking area; and
a control device configured to control supply of electric power from the power-transmitting coil to the power-receiving coil of the vehicle based on the signal received by the receiving device.

2. The wireless power-transmitting device according to claim 1, wherein the receiving device is installed obliquely in an upper side with respect to the vehicle so that the receiving device looks into an inside of the vehicle through the windshield or through the rear window of the vehicle parked in the parking region.

3. The wireless power-transmitting device according to claim 1, wherein a reception area of the receiving device is limited so that the receiving device receives only the signal transmitted from the vehicle parked in the parking region.

4. The wireless power-transmitting device according to claim 1,
wherein the power-transmitting coil, the receiving device, and the control device are associated and provided in each of a plurality of parking regions, and
the control device controls the supply of electric power from the associated power-transmitting coil based on the signal received by the associated receiving device.

5. The wireless power-transmitting device according to claim 1,
wherein the power-transmitting coil and the receiving device are associated and provided in each of a plurality of parking regions, and
the control device controls the supply of electric power from the power-transmitting coil associated with the receiving device which receives the signal.

6. The wireless power-transmitting device according to claim 1, wherein the signal for the power supply instruction is a light signal.

7. The wireless power-transmitting device according to claim 1, wherein the signal for the power supply instruction is a directional radio wave signal.

8. A wireless power-transmitting system for wirelessly supplying electric power, the wireless power-transmitting system comprising:
the wireless power-transmitting device according to claim 1; and
the vehicle which includes: the power-receiving coil configured to wirelessly receive electric power supplied from the power-transmitting coil of the wireless power-transmitting device; and the transmitting device configured to transmit the signal for the power supply instruction through at least one of the windshield and the rear window.

9. The wireless power-transmitting system according to claim 8, wherein the transmitting device includes:
a first transmitting device configured to transmit the first signal for the power supply instruction through the windshield; and
a second transmitting device configured to transmit the second signal for the power supply instruction through the rear window.

10. The wireless power-transmitting device according to claim 1, wherein the first signal and the second signal have different wavelengths from each other.

11. The wireless power-transmitting device according to claim 10,
wherein the receiving device includes a filter, and
the filter is configured to transmit the first signal without transmitting the second signal when the parking region is the head-in parking area, and the filter is configured to transmit the second signal without transmitting the first signal when the parking region is the back-in parking area.

* * * * *